United States Patent [19]

Johnson et al.

[11] 3,736,381

[45] May 29, 1973

[54] TIME DIVISION SWITCHING SYSTEM

[75] Inventors: Glover Douglas Johnson, Naperville; Keith Lynn Nicodemus, Wheaton; George Charles Schumacher, Glen Ellyn; Matthew Francis Slana, Naperville, all of Ill.

[73] Assignee: Bell Telephone Laboratories, Incorporated, Murray Hill, N.J.

[22] Filed: Oct. 1, 1971

[21] Appl. No.: 185,748

[52] U.S. Cl. ..........................179/15 AQ, 179/15 AT

[51] Int. Cl. ..........................H04j 3/00

[58] Field of Search ..........................179/15 AQ, 15 AT, 179/18 ES, 18 GF

[56] References Cited

UNITED STATES PATENTS 3,649,763 3/1972 Thompson..........................179/15 AQ
3,597,548 8/1971 Drinnan..........................179/15 AT
3,458,659 7/1969 Sternung..........................179/15 AQ

FOREIGN PATENTS OR APPLICATIONS 1,181,913 2/1970 Netherlands..........................179/15 AQ

*Primary Examiner*—Kathleen H. Claffy
*Assistant Examiner*—David L. Stewart
*Attorney*—R. J. Guenther and R. B. Ardis

[57] ABSTRACT

A toll telephone switching system for switching PCM data among time division multiplex lines is disclosed. The system comprises a symmetrical time-shared space division network and interface circuits which buffer incoming PCM data and distribute the incoming data from a group of multiplex lines over a group of input ports of the network. The interface circuits also buffer outgoing PCM data at the output side of the network and distribute the data from a group of output ports of the network over a group of outgoing multiplex lines.

8 Claims, 8 Drawing Figures

FIG. 3 TIME SHARED SPACE DIVISION NETWORK

FIG. 5

TIME SLOT NUMBER

| DECORRELATOR SWITCH INPUT TERMINAL | 0 | 1 | 2 | 3 | 4 | 5 | 6 | 7 | 8 | 9 | --- | 126 | 127 |
|---|---|---|---|---|---|---|---|---|---|---|---|---|---|
| 0 | 0 | 1 | 2 | 3 | 4 | 5 | 6 | 7 | 0 | 1 | --- | 6 | 7 |
| 1 | 1 | 2 | 3 | 4 | 5 | 6 | 7 | 0 | 1 | 2 | --- | 7 | 0 |
| 2 | 2 | 3 | 4 | 5 | 6 | 7 | 0 | 1 | 2 | 3 | --- | 0 | 1 |
| 3 | 3 | 4 | 5 | 6 | 7 | 0 | 1 | 2 | 3 | 4 | --- | 1 | 2 |
| 4 | 4 | 5 | 6 | 7 | 0 | 1 | 2 | 3 | 4 | 5 | --- | 2 | 3 |
| 5 | 5 | 6 | 7 | 0 | 1 | 2 | 3 | 4 | 5 | 6 | --- | 3 | 4 |
| 6 | 6 | 7 | 0 | 1 | 2 | 3 | 4 | 5 | 6 | 7 | --- | 4 | 5 |
| 7 | 7 | 0 | 1 | 2 | 3 | 4 | 5 | 6 | 7 | 0 | --- | 5 | 6 |

NUMBERS IN BODY OF THE GRAPH REPRESENT DECORRELATOR SWITCH OUTPUT TERMINALS

FIG. 6

TIME SLOT NUMBER

| RECORRELATOR SWITCH INPUT TERMINAL | 0 | 1 | 2 | 3 | 4 | 5 | 6 | 7 | 8 | 9 | --- | 126 | 127 |
|---|---|---|---|---|---|---|---|---|---|---|---|---|---|
| 0 | 0 | 7 | 6 | 5 | 4 | 3 | 2 | 1 | 0 | 7 | --- | 2 | 1 |
| 1 | 1 | 0 | 7 | 6 | 5 | 4 | 3 | 2 | 1 | 0 | --- | 3 | 2 |
| 2 | 2 | 1 | 0 | 7 | 6 | 5 | 4 | 3 | 2 | 1 | --- | 4 | 3 |
| 3 | 3 | 2 | 1 | 0 | 7 | 6 | 5 | 4 | 3 | 2 | --- | 5 | 4 |
| 4 | 4 | 3 | 2 | 1 | 0 | 7 | 6 | 5 | 4 | 3 | --- | 6 | 5 |
| 5 | 5 | 4 | 3 | 2 | 1 | 0 | 7 | 6 | 5 | 4 | --- | 7 | 6 |
| 6 | 6 | 5 | 4 | 3 | 2 | 1 | 0 | 7 | 6 | 5 | --- | 0 | 7 |
| 7 | 7 | 6 | 5 | 4 | 3 | 2 | 1 | 0 | 7 | 6 | --- | 1 | 0 |

NUMBERS IN BODY OF THE GRAPH REPRESENT RECORRELATOR SWITCH OUTPUT TERMINALS

DECORRELATOR SWITCH

RECORRELATOR SWITCH

TIME DIVISION SWITCHING SYSTEM

CROSS REFERENCE TO RELATED APPLICATION

This application is related to the application of G. D. Johnson Case 5 entitled "Time Division Switching System", which is being filed concurrently with the present application and which is assigned to Bell Telephone Laboratories, Incorporated, the assignee of the present application.

BACKGROUND OF THE INVENTION

The invention relates to a time division switching system for switching multiplexed data. The invention more particularly relates to a toll telephone system for switching PCM (pulse code modulated) data among time division multiplex lines.

It is the function of the telephone switching system to establish communication connections between calling lines or trunks and called lines or trunks. Systems are known in the prior art in which analog signals from a plurality of lines or trunks are converted to PCM data words and are multiplexed onto a single transmission line having a plurality of channels. Such a channel is an identifiable time period on the transmission line which occurs once in each time frame of the line. Known prior art systems typically have 24 channels per time frame and speech information from 24 independent lines or trunks is transmitted during each time frame. PCM information may be switched among multiplex lines by selectively transferring PCM data words from the various channels of an input multiplex line to a plurality of output multiplex lines. The transfer of data words from input multiplex lines to output multiplex lines may be accomplished by means of a multistage space division network which is reconfigured at a predetermined rate compatible with the rate at which the data is received from input multiplex lines.

It is known that severe blocking problems can occur in time-shared space division networks. Some techniques for overcoming such blocking are also known. One technique is to provide a nonblocking time division network having a cycle time which is one-half of the duration of a frame of the multiplex lines. Thus, to serve multiplex lines having $n$ channels per frame, the network must have $2n$ time slots during a period of time which is equivalent to one frame. Due to advances in the art, the operational rate of the multiplex lines has been increased to such an extent that the production of a time division network which is reconfigured twice for each channel becomes economically prohibitive if not infeasible by present day technology. Another technique for overcoming blocking in time-shared space division networks is to provide a nonblocking network on which each incoming multiplex line is given two appearances on the network. It is clear that such an arrangement becomes impractical in large systems due to the high cost of the network. Furthermore, it is known that networks having predetermined blocking characteristics can be built and that such networks are considerably less expensive than nonblocking networks. In large systems, for example, systems having over 1,000 input multiplex lines and a corresponding number of output multiplex lines, the economic advantage gained by using such a less expensive blocking network is substantial.

SUMMARY OF THE INVENTION

It is an object of this invention to reduce blocking in a time division switching system employing a time-shared switching network having a known blocking characteristic.

In accordance with this invention, the blocking problem in a time division switching system employing a network having predetermined blocking characteristics is alleviated by transferring, in each successive time slot, incoming data words from a group of lines having varying traffic loads, to a group of network associated buffer memories. In large telephone systems it is to be expected that the traffic load carried on voice frequency trunks will vary from trunk to trunk. Similarly, the traffic load on time division multiplex lines which carry traffic from a plurality of voice frequency trunks can also be expected to vary from line to line. By grouping multiplex lines of varying traffic loads and distributing the traffic of a group of lines over a group of network input ports, an averaging effect takes place. Therefore, even where some of the multiplex lines have a nearly 100 percent occupancy, the traffic from such lines can be averaged with traffic from lines of lesser occupancy. Thus, the traffic load applied to the input ports of the network will be less than 100 percent occupancy. Hence, a switching network having a predetermined blocking probability can be employed. Additionally, with the passage of time, the traffic on some multiplex lines can be expected to increase and on others it can be expected to decrease. In the system of this invention, the impact resulting from such variations is diminished since the only impact which is felt in the switching office is an increase or decrease in the average traffic load of groups of multiplex lines. Furthermore, in accordance with this invention, the traffic load from a group of input multiplex lines having considerably lower occupancy than the port occupancy which the network can handle without blocking may be distributed over a smaller group of input ports, thereby raising the occupancy of the ports to a level higher than that of the input multiplex lines. Similarly, where the occupancy of a group of input multiplex lines is known to be higher than the allowed port occupancy, traffic from a group of input multiplex lines may be distributed over a larger group of network ports, thereby lowering the port occupancy to a level below that of the input lines.

In accordance with this invention, one buffer memory is individually associated with each input port of the time-shared network, and one data word from each line of a group of input lines is transferred to a group of the buffer memories during each time slot clock period by means of a transfer circuit. The transfer circuit is reconfigured in successive time slots such that successively received data words are transferred to different ones of the port associated buffer memories. The information received from the input lines and stored in the port associated buffer memories comprises idle codes as well as other encoded information. Those input words which convey meaningful data are selectively transferred from the buffer memories to the associated input ports under control of information generated by the system's central processor and stored in time slot memories.

In one embodiment of this invention, all data words from a group of seven input time division multiplex lines are distributed over eight network input port associated buffer memories. The circuit employed to accomplish the transfer function is referred to herein as a decorrelator circuit. The decorrelator circuit is arranged to simultaneously transfer a multibit data word from each of the seven input multiplex lines to seven of the eight buffer memories during each time slot. The decorrelator circuit is reconfigured in accordance with a scheme which is modulo 8 repetitive. That is, the first, the ninth, the seventeenth, etc., bits from a line are always transferred to the same buffer memory.

The system selected for an illustrative embodiment of this invention is a toll telephone switching system in which a plurality of voice frequency trunks are multiplexed and the switching function is accomplished by switching digitally encoded samples of analog signals among time division multiplex lines. Because such time division multiplex lines may be of varying lengths and, therefore, have different delay characteristics, the illustrative system employs an input buffer memory for each multiplex line in which all data words received from the multiplex line are stored. The above-mentioned decorrelator circuit is employed to transfer the data words from the input buffer memories to the port associated buffer memories, which will be referred to hereinafter as intermediate buffer memories. Additionally, the illustrative system comprises an output buffer memory associated with each network output port and recorrelator circuits for transferring data words from each group of eight output buffer memories to an associated group of seven output multiplex lines. The decorrelator circuit, like the recorrelator circuit, is reconfigured each time slot. However, the distribution scheme of the recorrelator circuit is the true complement of the distribution scheme of the decorrelator circuit.

BRIEF DESCRIPTION OF THE DRAWING

FIGS. 5 and 6 represent in tabular form the interconnection relationship between the input and output terminals of the decorrelating and recorrelating circuits of the time slot interchange units, respectively.

DESCRIPTION

Figure 1:
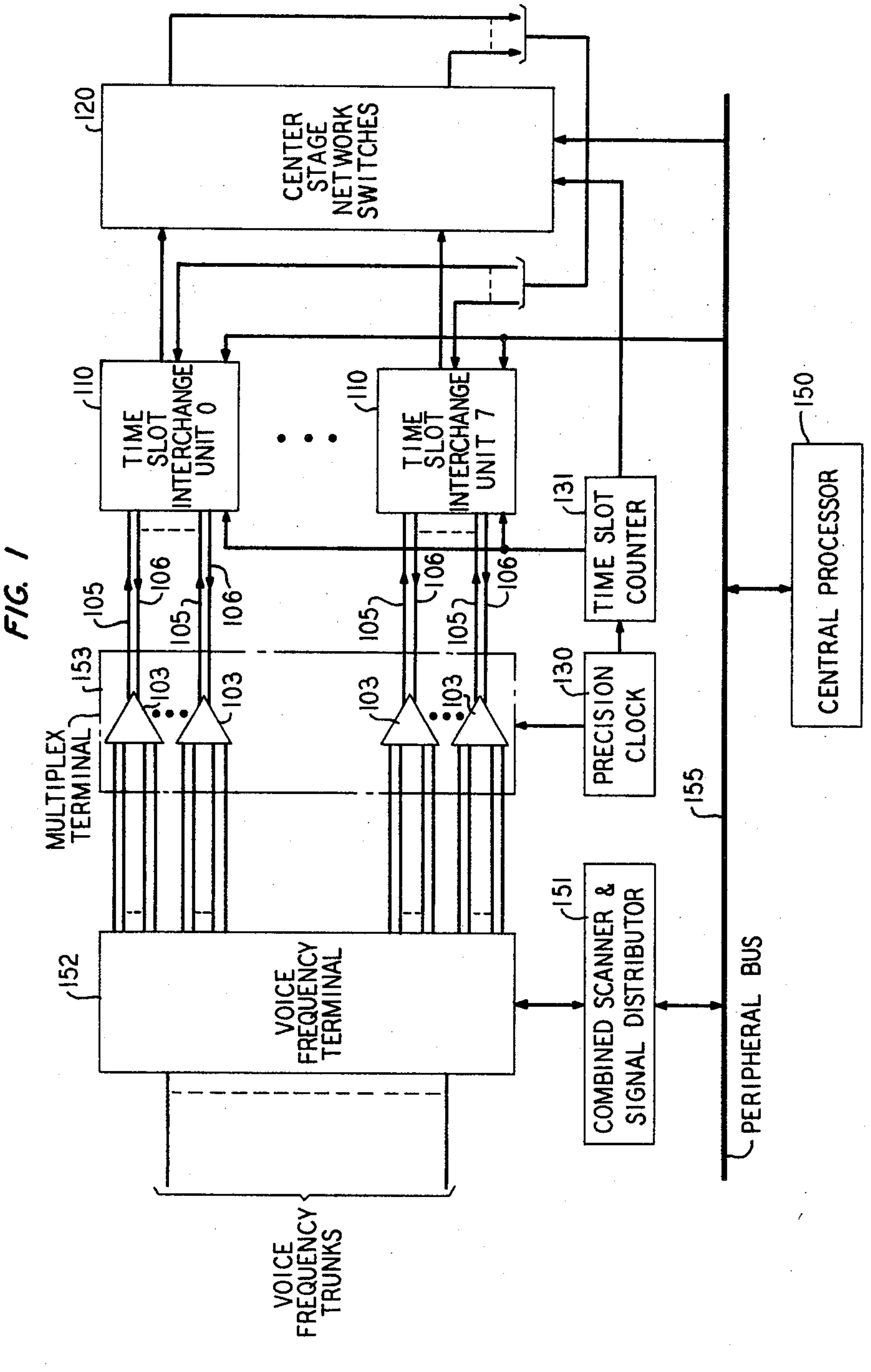
FIG. 1 is a block diagram representation of a telephone switching system which serves to illustrate the invention.

The function of the illustrative toll telephone system is to selectively establish communication paths between communication lines which extend from the toll office to other telephone offices. These communication lines may be voice frequency trunks carrying analog signals or multiplex lines carrying digital data. The illustrative system described herein is equipped to convert voice frequency information to multiplexed data words. The system comprises a terminal frame 152 to which the voice frequency trunks are connected. Some of these voice frequency trunks may be the well-known two-wire trunks and others may be four-wire trunks. The terminal frame 152 comprises circuits which convert all two-wire trunks into four-wire trunks having an incoming pair and an outgoing pair. The system further comprises a plurality of multiplex circuits 103 and each multiplex circuit has both the incoming and outgoing pairs of 120 voice frequency trunks connected thereto. Each multiplex circuit 103 comprises an analog-to-digital converter and a digital-to-analog converter. The analog-to-digital converter samples the analog signals occurring on each incoming pair of 120 trunks once during each 125 microsecond time period, which is referred to herein as one frame. Each 125 microsecond frame is divided into 128 time periods, referred to herein as channels, and each incoming pair connected to a multiplex circuit is uniquely assigned to one of the channels. The analog-to-digital converter converts each sample to a multibit digital data word. The number of bits used to represent a sample may vary with the multiplex mode employed. In this specification it will be assumed that each sample is encoded into an eight-bit digital word. However, it is understood that the number of bits used is not material to our invention. The digital data words are transmitted serially from a multiplex circuit 103 to a corresponding time slot interchange unit 110, by means of an input multiplex line 105. Each time slot interchange unit 110 comprises an input section and an output section. Data words received from an input multiplex line 105 are stored in an associated input buffer memory in the input section of the time slot interchange unit and are subsequently transferred by means of the network 120 to the output section of the same or an other time slot interchange unit. The output section of each time slot interchange unit comprises an output buffer memory for each output multiplex line 106 and digital data words representing speech samples are transmitted from the time slot interchange units to the multiplex circuits 103 by means of the output multiplex lines 106. A digital-to-analog converter in each multiplex circuit 103 converts the digital data words to analog signals. Each analog signal is applied to the outgoing pair of the voice trunk which corresponds to the channel on the output multiplex line 106 in which the digital word was transmitted.

The multiplex circuits 103 receive timing pulses from the precision clock 130, which is shown in FIG. 1, to generate the 128 channels in each 125 microsecond frame of the input multiplex lines 105. The precision clock 130 also supplies timing pulses to the time slot counter 131 which in turn supplies time slot pulses to the control circuits of the network and the time slot interchange units. Thus, the timing of the multiplex circuits and of the switching portion of the system are derived from a common source. The time slot counter 131 supplies 128 time slot pulses during each 125 microsecond cycle and additionally supplies certain pulses representing a plurality of time slots. The transfer of digital data words from the input section of a time slot interchange unit through the time-shared network to the output section of the same or another time slot interchange unit is controlled by information stored in a plurality of time slot memories. Information is read from the time slot memories in response to time slot pulses supplied by the time slot counter 131 and a new set of transfer paths is established in the network during each successive time slot. Information is written into the time slot memories by the central processor 150 via the peripheral buss 155. The central processor 150 may be any known data processing machine capable of communicating with the telephone equipment of this illustrative system and capable of making various calculations and translations necessary for the control of the system. A processor having such general capability is described in *The Bell System Technical Journal*, Volume XLIII, September 1964, Number 4, Part 1, pages 1,845 to 1,923. In the illustrative system, the central processor communicates with a peripheral unit referred to herein as the combined scanner and signal distributor 151. This unit autonomously scans all the trunks having an appearance on the terminal frame 152 for changes in supervisory states, and receives signaling information from the trunks. The combined scanner and signal distributor 151 communicates with the central processor 150 via the peripheral bus 155 and is responsive to commands from the central processor 150 to relay information to the processor and to transmit signaling information on the trunks.

The operation of the illustrative system may be better understood by means of a brief discussion of a sample call. The combined scanner and signal distributor 151 continuously scans the trunks for requests for service and, upon detection of such a request, passes this information, including information identifying the trunks requesting service, to the central processor 150. Upon command from the central processor, the combined scanner and signal distributor begins to scan for incoming call signaling information, which is subsequently passed on to the central processor. The central processor interprets the signaling information to identify the central office which is desired to be reached and selects an available trunk to that central office. By translation of the calling trunk identity information the central processor determines the identity of the time slot interchange unit and the addresses of the locations in the intermediate and output buffer memories in the time slot interchange unit, associated with the calling trunk. Similarly, by translation of the called trunk identity information (i.e., the selected trunk to the called office), the central processor determines the time slot interchange unit and the locations in the intermediate and output buffer memories associated with the called trunk. The central processor subsequently selects two idle network paths in one of the 128 time slots. One path is used to transfer PCM data from the network input port associated with the calling trunk to the output port associated with the called trunk, and the other path is used to transfer PCM data from the input port associated with the called trunk to the output port associated with the calling trunk. Furthermore, the central processor computes the necessary signaling information to be transmitted on the called trunk to the distant office and transmits this information to the combined scanner and signal distributor 151. After the necessary acknowledge signals have been received from the destination office, the central processor computes and transmits to the appropriate time slot memories the information necessary to transfer the PCM data from the intermediate buffer memories through the network to the output buffer memories. Thereafter, information from the calling trunk is transferred to the called trunk and input information from the called trunk is transferred to the calling trunk once every 125 microseconds, until the call is terminated.

Figure 2:
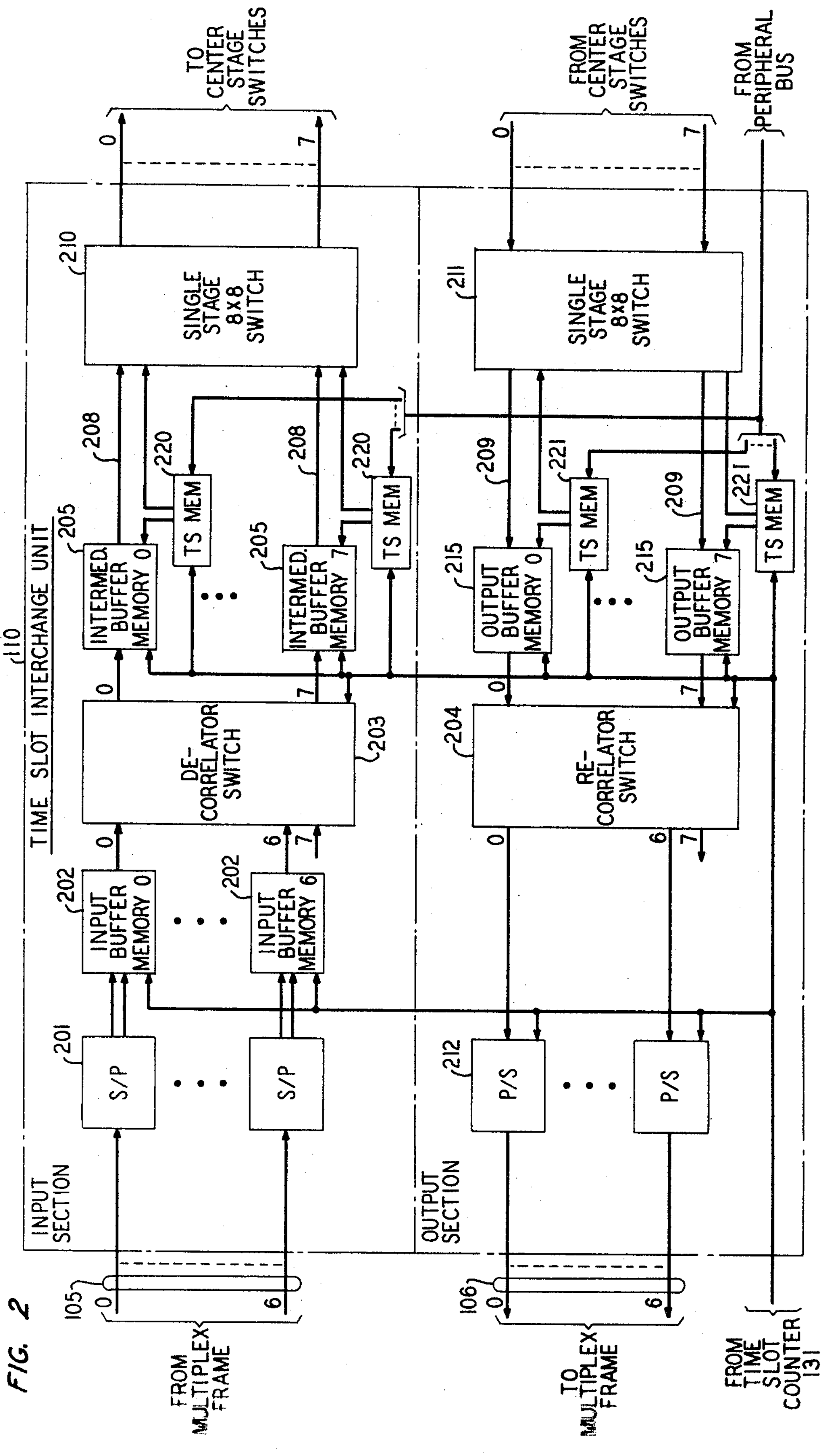
FIG. 2 shows in greater detail a time slot interchange unit of the illustrative system which comprises a specific embodiment of the invention.

The time slot interchange units 110 will now be discussed in greater detail with reference to FIG. 2. Since all time slot interchange units are identical, the discussion of one of these units will suffice for the purposes of this description. As mentioned earlier, each time slot interchange unit is divided into an input section and an output section. Seven input multiplex lines 105 are connected to each input section and seven output multiplex lines 106 are connected to each output section. Each time slot interchange unit comprises three sets of buffer memories, a set of seven input buffer memories 202, a set of eight intermediate buffer memories 205, and a set of eight output buffer memories 215. Each buffer memory comprises 128 word locations corresponding to the 128 channels of a multiplex frame. Memories of this size were chosen for the illustrative system for the sake of convenience and simplicity and it is understood that memories of a different size could be used, depending upon the rate of loading and unloading of the memories. Neither the memory elements nor the access circuitry for the memories is described in detail herein as the memory elements may be of any known type, such as magnetic core memories, and access circuitry for such memories is well known in the art. The loading and unloading, like all other time dependent operations within the time slot interchange units, are performed under control of pulses supplied by the time slot counter 131. Each of the buffer memories may be both loaded and unloaded from specified locations during a single time slot. It is necessary that the memories have this property since a number of independent data transfer operations occur within the switching system during each time slot, as will be explained further in subsequent paragraphs.

The time slot interchange units receive, from each input multiplex line 105 connected to the unit, a serial stream of digitally encoded speech samples of analog signals and framing marks. The series-to-parallel converter 201 converts each sample into an eight-bit parallel word and derives a corresponding channel number, which is transmitted with the eight-bit word to the input buffer memory 202 to which the converter is connected. The channel number serves to define the address of the location within the input buffer memory in which the accompanying eight-bit word is to be stored. The loading of the input buffer memories is carried out in response to a time slot clock pulse and is only one of a plurality of operations taking place during each time slot. Data transfers from input buffer memories to intermediate buffer memories, from intermediate buffer memories to output buffer memories, and from output buffer memories to output multiplex lines also take place during each time slot. Thus, each of the buffer memories must be capable of being read and written into during a single time slot.

Figure 7:
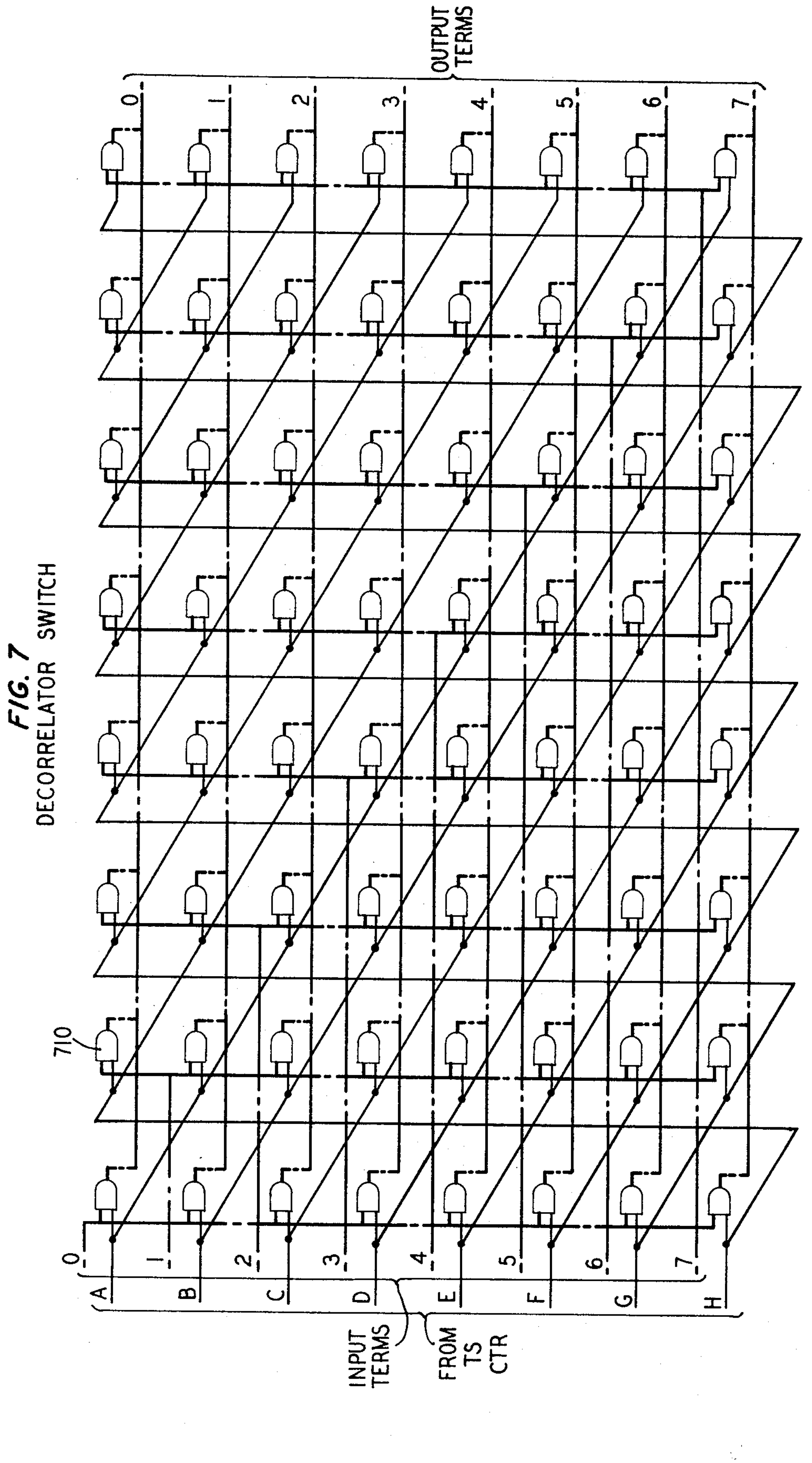
FIGS. 7 and 8 are schematic representations of the decorrelating and recorrelating circuits, respectively.

The transfer of data from the input buffer memories to the intermediate buffer memories is by means of the decorrelator switch 203. It is the function of the decorrelator switch 203 to equalize the traffic load and to effect a reduction of the traffic load which is applied to the input ports of the switching network. The decorrelator switch acts both as an expander and as a distribution circuit. A logic diagram representation of the switch is shown in FIG. 7. The logic gates of the switch are operated under control of timing pulses supplied by time slot counter 131. During each time slot seven data words, one from each of the seven input buffer memories 202, are distributed to seven of the eight intermediate buffer memories 205. In successive time slots data is read in sequence from the locations of the seven input buffer memories and distributed to a different set of seven intermediate buffer memories. For example, during time slot 0, a data word is read from location 0 of each of the input buffer memories and transferred to location 0 of intermediate buffer memories 0 through 6; during time slot 1, a data word is read from location 1 of each of the input buffer memories and transferred to location 1 of intermediate buffer memories 1 through 7. Since there are eight intermediate buffer memories, it should be apparent that the distribution scheme will be modulo 8 repetitive. The interconnection pattern between the input and output terminals of the decorrelator switch 203 are shown in graphical form, as a function of the time slots, in FIG. 5.

FIG. 5 indicates that there are eight decorrelator input terminals labeled 0 through 7 but only terminals 0 through 6 have connection to an input buffer memory. FIG. 2 shows that terminal 7 is left without connection. However, this terminal may be used as a test terminal for introducing test data into the system. From FIG. 5 it can be determined that during time slot 0 input terminal 0 of the decorrelator switch is connected to output terminal 0, while during time slot 1 it is connected to output terminal 1, etc. Furthermore, during time slot 7, input terminal 0 is connected to output terminal 7 and during time slot 8 it is again connected to output terminal 0. Thus, a modulo 8 repetitive pattern is developed with respect to input terminal 0. A further inspection of the figure will show that a like pattern exists with respect to the other input terminals. Since each input terminal is connected to a like numbered output terminal during time slot 0, it will also be connected to that same terminal during time slots 8, 16, 24, etc., up to 120. In each successive time slot after time slot 0 each input terminal is connected to the next higher numbered output terminal when counted in modulo 8 arithmetic.

FIG. 7 shows that the decorrelator switch 203 comprises 64 symbolic AND gates (e.g., AND gate 710). Each of the symbolic AND gates represents eight logic gates and each of the inputs labeled 0 through 7 and each of the outputs labeled 0 through 7 represents eight independent conductors. Thus, an eight-bit parallel word can be transmitted on each of the paths shown in FIG. 7. FIG. 7 further shows eight control leads, labeled A through H. These control leads carry timing pulses, generated by the time slot counter 131, which serve to control the transfer of data through the switch. Only one of the eight control leads is active during any one time slot, and each control lead activates eight of the symbolic AND gates. Thus, during each time slot, eight eight-bit words can be simultaneously transferred from the eight input terminals to the eight output terminals. It should be noted that this switch does not operate under direct control of the central processor 150 and that the data words are transferred to the intermediate buffer memories independent of whether or not they indeed convey conversation-related information. The relationship between the timing pulses on control leads A through H and the system's time slots is shown in Table A.

TABLE A

A = time slot 0, 8, 16 . . . 120
B = time slot 1. 9, 17 . . . 121
C = time slot 2, 10, 18 . . . 122
D = time slot 3, 11, 19 . . . 123
E = time slot 4, 12, 20 . . . 124
F = time slot 5, 13, 21 . . . 125
G = time slot 6, 14, 22 . . . 126
H = time slot 7, 15, 23 . . . 127

The intermediate buffer memories 205 are each connected to one network input port and data is transferred from the intermediate buffer memories to the network input ports under control of time slot memories 220. The single stage switch 210, shown in FIG. 2, is the first stage of the system's four-stage time-shared space division network shown in FIG. 3. The time slot memories 220 contain information defining the locations of the intermediate buffer memory from which data is to be read and information defining connections to be made in the single stage switch 210.

Figure 3:
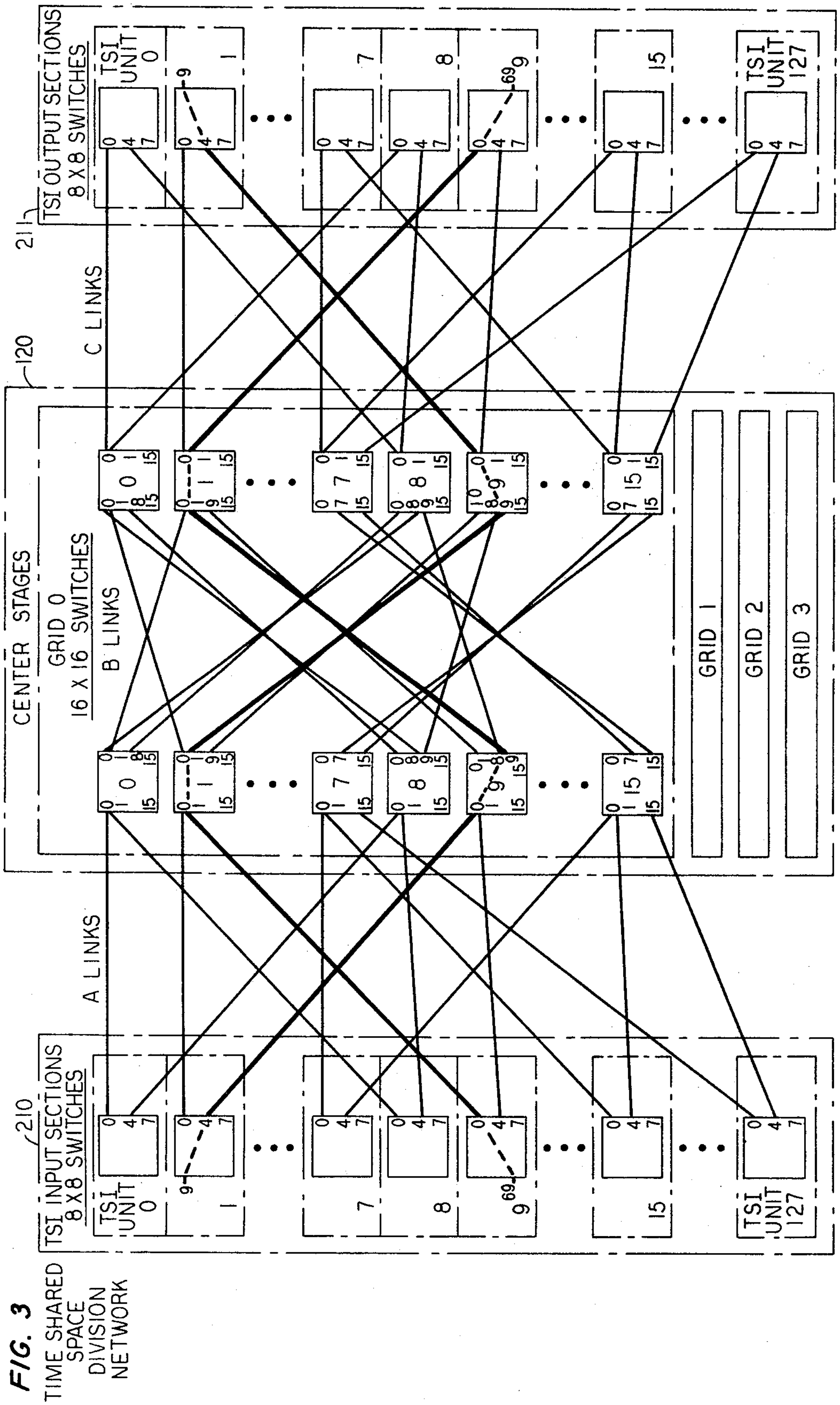
FIG. 3 shows an illustrative four-stage time-shared space division network used in conjunction with the time slot interchange unit.

From an intermediate buffer memory the data words are transferred through the time-shared network to output buffer memories 215 of the same or other time slot interchange units. The single stage switch 211 shown in FIG. 2 belongs to the last stage of the four-stage network, which is shown in FIG. 3. Eight output buffer memories 215 are connected to the eight output terminals of the single stage switch and data is transferred through the switch 211 to the output buffer memories 215 under control of time slot memories 221. Each time slot memory 221 contains information defining connections to be established in the single stage switch 211 and information defining the location in which a data word is to be stored in the associated output buffer memory 215. In the illustrative system data is transferred through the network in serial form. To provide for the necessary conversion, the intermediate buffer memories 205 each contain an output shift register and the output buffer memories 215 each contain an input shift register. In addition to the eight-bit digital word representing a speech sample, a leading "1" is transmitted from the intermediate buffer memories to the output buffer memories. This leading "1" serves to correlate the input shift register of the output buffer memory with the output shift register of the intermediate buffer memory. The details of the shift registers and the related circuitry are not described herein as shift registers required for such a function are known in the art. As mentioned earlier, the output section of each time slot interchange unit has seven output multiplex lines 106 thereto. Associated with each line is a parallel-to-series converter which receives an eight-bit parallel word from the output buffer memories, and which transmits the word in serial form along with framing marks on the associated output multiplex lines. Data words are transferred from the output buffer memories 215 to the parallel-to-series converters 212 by means of the recorrelator switch 204. During each time slot a data word is transferred to each parallel-to-series converter. However, ordinarily there is not a speech sample for each channel of the outgoing multiplex line and an idle channel code will be transferred from the output buffer memory to the parallel-to-series converter if no speech sample is to be transmitted in a specified channel.

The recorrelator switch 204 serves to compress data originating from eight network output ports onto seven output multiplex lines and to distribute the data to the seven output lines in accordance with a distribution algorithm which is complementary to the distribution algorithm of the decorrelator switch 203. It is understood that is is not essential to the operation of the system that the recorrelator be complementary since any transposition introduced by the decorrelator may be compensated for by translation in the central processor 150. Thus, in cases where the decorrelator is not used as an expander, the recorrelator is not essential. The recorrelator switch operates under control of pulses from the time slot counter 131 and during each time slot a word is read from each of the eight output buffer memories 215 and distributed to eight output terminals of the switch. From FIG. 2 it can be seen that a parallel-to-series converter is connected to each of the output terminals 0 through 6 of the switch but that no connection has been made to output terminal 7. Output terminal 7 of the recorrelator switch 204 corresponds to input terminal 7 of the decorrelator switch 203, and may be used as a test output terminal. FIG. 6 shows the relationship between the input and output terminals of the recorrelator switch 204 as a function of the time slots. A comparison of FIG. 6 with FIG. 5 will show that the scheme of FIG. 6 is the true modulo 8 complement of the scheme of FIG. 5 (the true modulo 8 complement of a number being defined as the value which must be added to that number to produce the sum of eight). By the use of the complementary scheme the skew introduced by the decorrelator switch 203 is completely canceled by the recorrelator switch 204. In the recorrelator switch 204 each input terminal is connected to the like numbered output terminal during time slots 0, 8, 16, etc., and is connected to the next lower numbered output terminal, when counted in modulo 8 arithmetic, in successive time slots.

Figure 8:
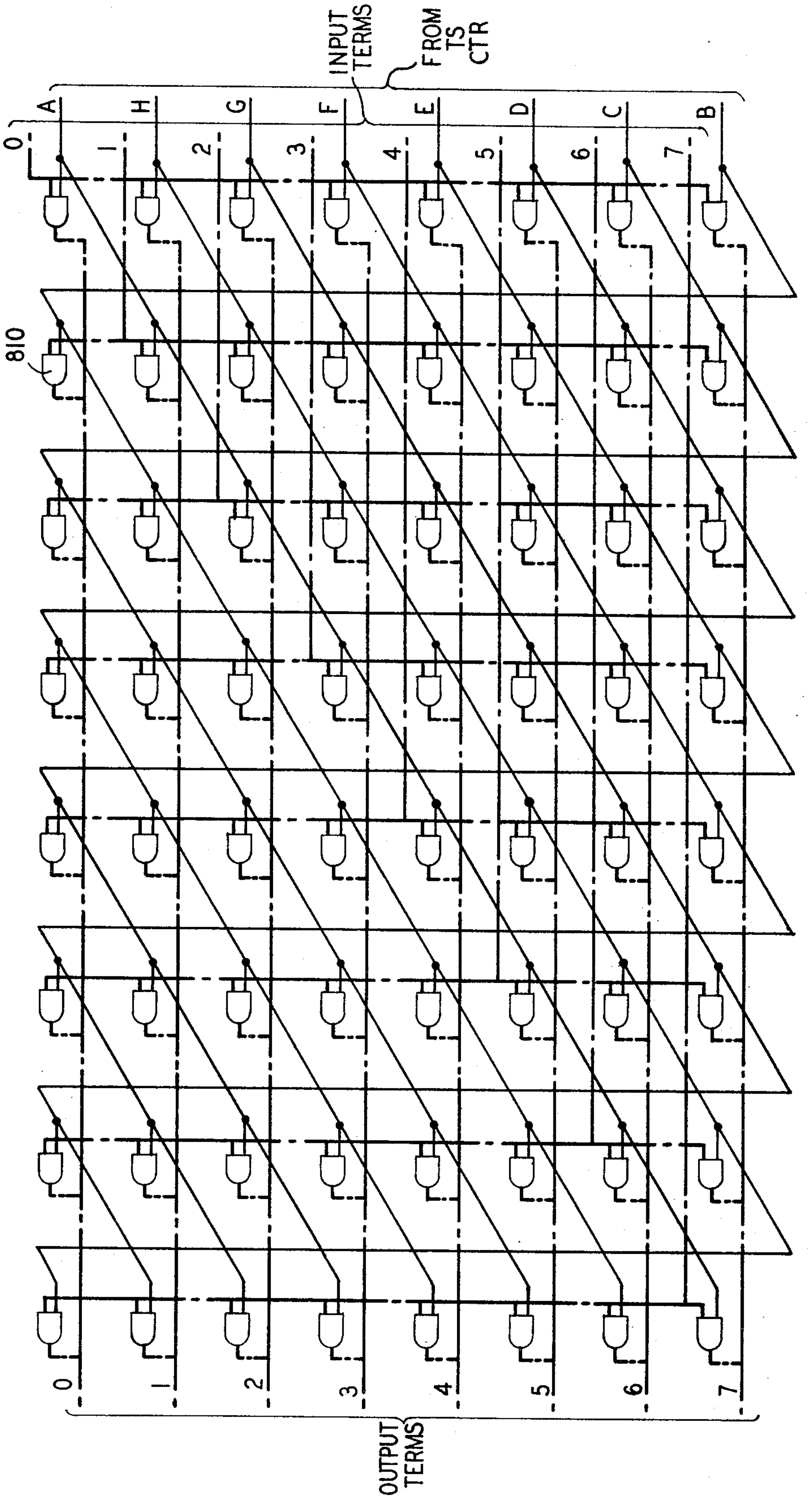

FIG. 8 is a schematic diagram representation of the recorrelator switch 204 which, like the decorrelator switch 203 shown in FIG. 7, comprises 64 symbolic AND gates (e.g., AND gate 810). Each of the symbolic AND gates represents eight logic gates and each of the inputs labeled 0 through 7 and outputs labeled 0 through 7 represents eight independent conductors. The control leads A through H shown in FIG. 8 represent the same leads as the control leads A through H shown in FIG. 7. The control leads A through H are directly related to the time slots in the manner shown in Table A (supra).

Figure 4:
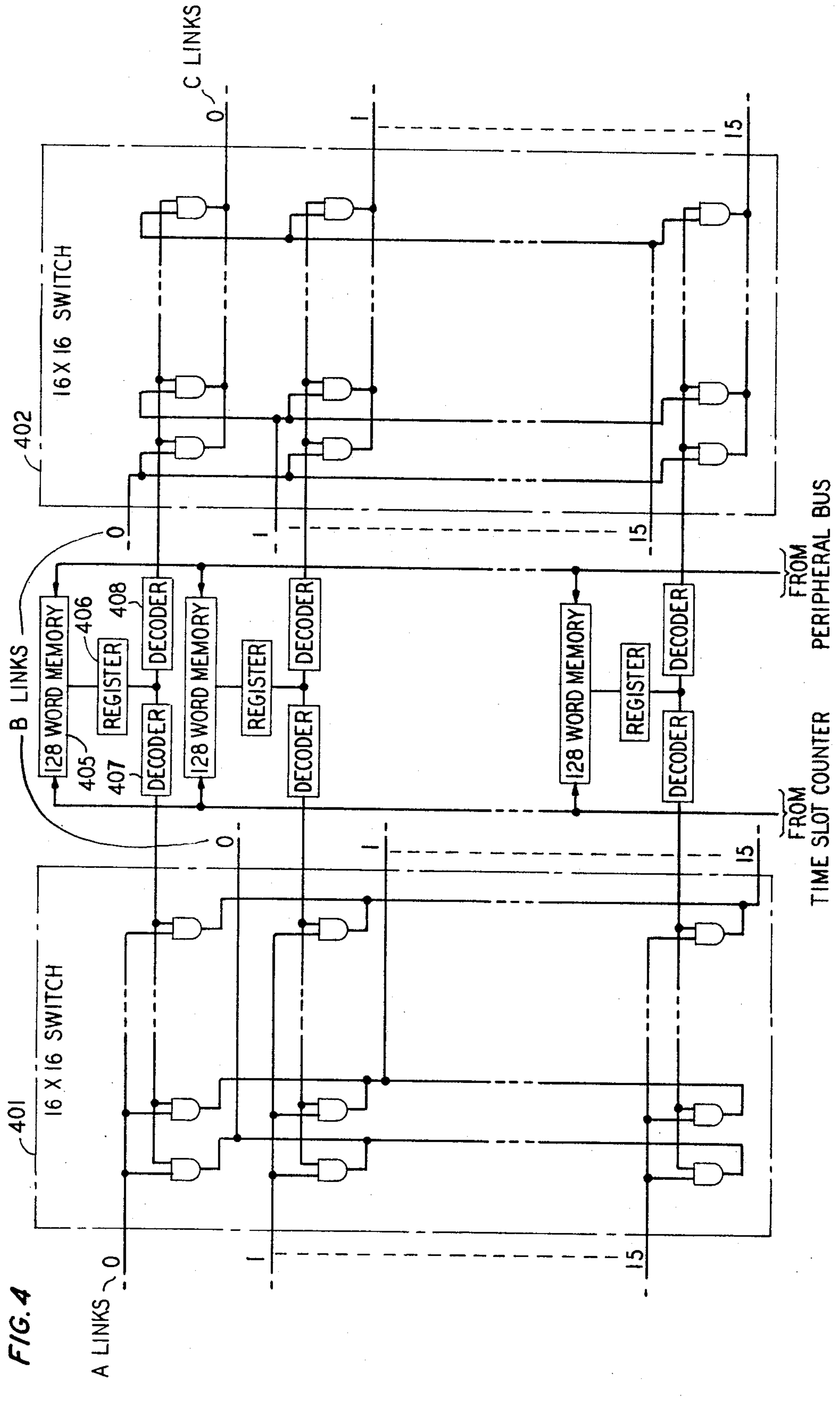
FIG. 4 shows a pair of representative network switches as used in the center stages of the network, and illustrates the control of the center stages.

FIG. 3 shows an illustrative four-stage time-shared space division network which may be used in conjunction with the time slot interchange unit described above. The illustrative network is completely symmetrical. However, it is to be understood that a symmetrical network is not required to practice the invention. In the network of FIG. 4 the pattern of links interconnecting the network stages to the left of an imaginary center line drawn through the network is a mirror image of the pattern to the right of the center line. Furthermore, there is a direct correspondence between the input ports and output ports of the network. Each voice frequency trunk connected to the system has an incoming pair and an outgoing pair connected to one of the multiplex circuits 103 which in turn has an input and an output time division multiplex line connected to one of the time slot interchange units of the system. Each incoming pair is assigned to a unique channel on the input multiplex line and the corresponding outgoing pair is assigned to the same channel on the output multiplex line. Since the transfer pattern between the multiplex lines and the network in the time slot interchange units is fixed, it follows that there is an identifiable input port and output port associated with each channel and, therefore, with each voice trunk connected to the system. The network is time-shared and, therefore, a plurality of channels is associated with each port of the network, but each voice frequency trunk can be associated with only one specific input port and output port. Connections to the network are chosen such that the output port associated with a certain voice trunk is given the same numerical designation as the input port associated with that trunk.

The first and last stages of the network each comprise 128 8 × 8 switches. The center portion of the network consists of four independent grids each comprising sixteen 16 × 16 second stage switches and sixteen 16 × 16 third stage switches. The various stages of the network are interconnected by means of links; the A links interconnect the first and second stages, the B links interconnect the second and third stages, and the C links interconnect the third and fourth stages. Each stage has 1,024 input terminals and output terminals and each input or output terminal can be defined by a 10-bit binary number. If an output terminal of the first stage is defined by the binary number M9 . . . M0 and an output terminal of the second stage is defined by the binary number N9 . . . N0, then the A link interconnection pattern is defined as follows.

M9 . . . M0 is connected to N9 . . . N0 and
N9 . . . N0 = M1 M0 M2 M5 M4 M3 M9 M8 M7 M6;
where
M9 . . . M3 identifies a first stage switch,
M2 M1 M0 identifies a level of a switch,
N9 N8 identifies a center stage grid,
N7 . . . N4 identifies a second stage switch, and
N3 . . . N0 identifies a level of a switch.

The two center stages of the network are divided into four identical independent grids and connections between the second and third stage switches are made only within a grid. In each grid there are 256 second stage output terminals and 256 third stage input terminals. Thus, an output terminal or an input terminal may be defined by an eight-bit binary word. If P7 . . . P0 represents the binary number identifying an output terminal of the second stage and Q7 . . . Q0 represents the binary number identifying an input terminal of the third stage, the B link interconnection pattern for each of the grids may be defined as follows.

P7 . . . P0 is connected to Q7 . . . Q0 and
Q7 . . . Q0 = P3 P2 P1 P0 P7 P6 P5 P4;
where
P7 . . . P4 identifies a second stage switch,
P3 . . . P0 identifies a level of a switch,
Q7 . . . Q4 identifies a third stage switch, and
Q3 . . . Q0 identifies a level in a switch.

There is an exception to the above B link pattern when P7 . . . P4 is identically equal to P3 . . . P0. When that condition exists, the B link pattern is defined as follows.

Q7 . . . Q0 = $\overline{P3}$ P2 P1 P0 $\overline{P7}$ P6 P5 P4.

The reason for this exception is to provide more B link path possibilities in cases where the calling trunk and called trunk are both associated with a single second stage switch.

The C link interconnection pattern is the same as the A link interconnection pattern. If R9 . . . R0 represents the binary number identifying an input terminal of the fourth stage of the network and S9 . . . S0 represents the binary number identifying an output terminal of the third stage of the network, the C link interconnection pattern is defined as follows.

R9 . . . R0 is connected to S9 . . . S0 and
S9 . . . S0 = R1 R0 R2 R5 R4 R3 R9 R8 R7 R6; where
R9 . . . R3 identifies a fourth stage switch,
R3 . . . R0 identifies a level of a switch,
S9 S8 identifies a center stage grid,
S7 . . . S4 identifies a third stage switch, and
S3 . . . S0 identifies a level of a switch.

Because of the symmetrical nature of the network it is possible to always use complementary paths through the network. The heavy lines running through the network in FIG. 3 show two complete paths for establishing communications between a voice trunk associated with network input and output ports number 9 and a voice trunk associated with input and output ports number 69. As explained earlier herein, before a path can be established through the network the central processor 150 must hunt for idle paths in the network. In order to facilitate this path hunt, the central processor 150 maintains a record of the busy and idle status of the links of the network. In order to find two complete idle paths, the processor would have to find two idle A links, two idle B links, and two idle C links. By using a symmetrical network and complementary paths the processor needs to find only idle A link, one idle B link, and one idle C link. Having found these three idle links no further search is needed since it is certain that the corresponding mirror image links are also idle. As a consequence the processor needs less memory space for storing link busy-idle information and requires less processor real time to perform the path hunt. Having determined the links to be employed the processor must then compute the information for controlling the first, second, third, and fourth stage switches which interconnect the selected links. Because of the symmetrical nature of the network the interconnections made in the first and fourth stages of the network are complementary and the interconnections made in the second and third stages of the network are complementary. Hence, one control word can be used to control both the first and fourth stage switches and another control word can be used to control the second and third stage switches. Consequently, less processor real time is required to generate control words. Furthermore, it is possible to only use one time slot memory to simultaneously control a set of second stage switches and a corresponding set of third stage switches. The control of the two center stages is illustrated in FIG. 4.

It is to be understood that the above-described arrangement is merely illustrative of the application of the principles of the invention, and that other arrangements may be devised by those skilled in the art without departing from the spirit and scope of the invention. The illustrative toll telephone system described above comprises circuits for analog-to-digital and digital-to-analog conversion. It is, of course, understood that the invention has equal utility in systems having only digital lines connected thereto.

What is claimed is:

1. A communication switching system comprising:
a plurality of input time division multiplex lines and a plurality of output time division multiplex lines,
a switching network having a plurality of input ports and a plurality of output ports,
a plurality of input buffer memories equal in number to the number of said input ports and individually associated with corresponding ones of said input ports for storing data words,
first transfer means for simultaneously transferring and distributing incoming data words received from said plurality of input multiplex lines to a corresponding number of said plurality of buffer memories in accordance with a fixed first distribution plan, the data words of a series of words received from each input multiplex line being distributed to all of said buffer memories in a prescribed sequence,
means for transmitting data words from selected ones of said buffer memories to said associated ones of said input ports,
means for controlling said switching network to establish transfer paths in said network between said selected ones of said input ports and selected ones of said output ports, and
second transfer means for transferring outgoing data words from said selected ones of said output ports to said output multiplex lines.

2. A communication switching system in accordance with claim 1 wherein said second transfer means comprises: a plurality of output buffer memories equal in number to the number of said output ports and individually associated with corresponding ones of said output ports for storing data words, means for transmitting data words from selected ones of said output ports to said associated ones of said output buffer memories and means for transferring and distributing outgoing data words simultaneously from said plurality of output buffer memories to said plurality of output multiplex lines in accordance with a fixed second distribution plan which is complementary to said first distribution plan.

3. A system in accordance with claim 2 wherein the number of lines in said plurality of input multiplex lines is in a ratio to the number of memories in said plurality of buffer memories as $m$ is to $n$ and wherein the number of ports in said plurality of output ports is in a ratio to the number of lines in said plurality of output multiplex lines as $n$ is to $m$ and wherein $n$ is equal to or greater than $m$.

4. A communication switching system in accordance with claim 1 which further comprises clock means for generating a chain of clock pulses representing time slots, and wherein said first transfer means responds to each successive time slot clock pulse generated by said clock means to establish a plurality of paths equal in number to the number of said input time division multiplex lines to simultaneously transfer one data word if present from each of said plurality of input lines.

5. A communication switching system in accordance with claim 4 wherein said input time division multiplex lines are numbered $k$ through $n$, said input buffer memories are numbered $k$ through $m$, $m$ being equal to or larger than $n$ and wherein said first transfer means responds to clock pulses defining a first time slot in a recurring sequence of clock pulses to simultaneously establish individual data transfer paths from each of said input multiplex lines to like numbered ones of said input buffer memories and responds to other time slot pulses in the said recurring sequence to establish further individual data transfer paths in sequence from each of said input multiplex lines to ones of said buffer memories having numbers other than those of the connected input time multiplex lines.

6. A communication switching system in accordance with claim 5 wherein said recurring sequence of clock pulses recurs at the rate of once every time slots.

7. A communication switching system comprising:

a plurality of input time division multiplex lines and a corresponding plurality of output time division multiplex lines;

a time division switching network comprising:

a plurality of network input ports, a plurality of network output ports, and switching means for selectively interconnecting said input ports and said output ports in response to network control signals;

a plurality of input buffer memories equal in number to the number of said input time division multiplex lines and individually associated therewith on a one-for-one basis;

a plurality of input port memories equal in number to the number of said input ports and individually associated therewith on a one-for-one basis;

means for storing data received from said time division multiplex lines in said corresponding input buffer memories;

input transfer means for establishing transmission paths for simultaneously transferring and distributing data words stored in said input buffer memories to a corresponding number of said plurality of input port memories in accordance with a fixed first distribution plan, the data words of a series of words stored in each input buffer memory being distributed to all of said input port memories in a prescribed sequence;

means for generating said network control signals; and second transfer means for transferring data words from selected ones of said output ports to selected ones of said output multiplex lines.

8. A communication switching system in accordance with claim 7 wherein said second transfer means comprises:

a plurality of output port memories equal in number to the number of said output ports and individually associated with corresponding ones of said output ports for storing data words, means for storing data words received from selected ones of said output ports to said associated ones of said output port memories;

a plurality of output buffer memories equal in number to the number of said output time division multiplex lines; and means for transferring and distributing data words stored in said output port memories from said plurality of output port memories to said plurality of output buffer memories in accordance with a fixed second distribution plan which is complementary to said first distribution plan.

* * * * *

UNITED STATES PATENT OFFICE
CERTIFICATE OF CORRECTION

Patent No. 3,736,381 Dated May 29, 1973

Inventor(s) Glover D. Johnson, Keith L. Nicodemus, George C. Schumacher, Matthew F. Slana It is certified that error appears in the above-identified patent and that said Letters Patent are hereby corrected as shown below:

Column 5, line 3, "peripheral buss 155" should read --peripheral bus 155--. Column 8, line 2 of the Table should read --B = time slot 1, 9, 17 ... 121--. Column 8, line 53, "106 thereto" should read --106 connected thereto--. Column 10, line 29, "and an output" should read --and an input--. Column 11, line 33, "only idle A" should read --only one idle A--. Column 13, line 10, "every time slots" should read --every [m - (k - 1)] time slots--. Column 13, line 30, "establishing transmission" should read --establishing simultaneously transmission--. Column 13, line 31, "paths for simultaneously" should read --paths for transferring--.

Signed and Sealed this

*second* Day of *September 1975*

[SEAL]

*Attest:*

RUTH C. MASON
*Attesting Officer*

C. MARSHALL DANN
*Commissioner of Patents and Trademarks*

USCOMM-DC 60376-P69
U.S. GOVERNMENT PRINTING OFFICE : 1969 O—366-334